(12) United States Patent
Orii (10) Patent No.: US 7,024,667 B2
(45) Date of Patent: Apr. 4, 2006

(54) PARALLEL EFFICIENCY CALCULATING METHOD AND APPARATUS

(75) Inventor: Shigeo Orii, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 768 days.

(21) Appl. No.: 09/998,160

(22) Filed: Dec. 3, 2001

(65) Prior Publication Data

US 2003/0036884 A1    Feb. 20, 2003

(30) Foreign Application Priority Data

Aug. 8, 2001    (JP)    ............................. 2001-241121

(51) Int. Cl.
G06F 9/44 (2006.01)
(52) U.S. Cl. ........................ 717/149; 717/124; 717/129
(58) Field of Classification Search ................ 717/131, 717/140, 149–153, 159–161
See application file for complete search history.

(56) References Cited

U.S. PATENT DOCUMENTS

| | | | |
|---|---|---|---|
| 5,151,991 A * | 9/1992 | Iwasawa et al. | 717/150 |
| 5,245,638 A * | 9/1993 | Gustafson | 714/47 |
| 5,684,947 A * | 11/1997 | Horie | 714/37 |
| 6,292,885 B1 * | 9/2001 | Nakai et al. | 712/219 |
| 6,308,316 B1 * | 10/2001 | Hashimoto et al. | 717/127 |

OTHER PUBLICATIONS

Sasaki et al. 'Parallelism in Algebraic Computation and Parallel Algorithms for Symbolic Linear Systems', 1981, Proceedings of the fourth ACM symposium on Symbolic and algebraic computation, pp. 160-167.*

Bucher 'The Computational Speed of Supercomputers'; 1983, Proceedings of the 1983 ACM SIGMETRICS conference on Measurement and modeling of computer systems, pp. 151-165.*

Chamberlain et al. 'How Are We Doing? An Efficiency Measure for Shared, Heterogeneous Systems', Sep. 1998, in Proc. of the ISCA 11th Int'l Conf. on Parallel and Distributed Computing Systems, pp. 15-21.*

(Continued)

*Primary Examiner*—Kakali Chaki
*Assistant Examiner*—Jason Mitchell
(74) *Attorney, Agent, or Firm*—Staas & Halsey LLP (57) ABSTRACT

The present invention is to clarify causes of hampering the performance by quantitatively associating a value of a parallel efficiency with factors of hampering the improvement of the performance of a parallel computer system, Processing time $\alpha(p, n)$ for a portion to be sequentially processed, processing time $\beta(p, n)/p$ for a portion to be parallel processed and processing time $\sigma(p, n)$ caused by an overhead for the parallel processing at the time of the execution of a parallel processing program are measured. A parallelized rate $R_{para}(p, n)$, a sequential calculation time ratio $R_\alpha(p, n)$ and a parallel overhead ratio $R_o(p, n)$ are calculated by using the obtained processing time $\sigma(p, n)$ for the portion to be sequentially processed, $\beta(p, n)$ for the portion to be parallel processed and $\sigma(p, n)$ caused by the overhead for the parallel processing. A parallel efficiency $E_{para}(p, n)$ is calculated in accordance with an expression $1/R_{para}(p, n) \times (1-R_\alpha(p, n)-R_o(p, n))$.

18 Claims, 5 Drawing Sheets

OTHER PUBLICATIONS

Davies "The Performance and Scalability of Parallel Systems", Dec. 1994, University of Bristol.*

Hiroshi Watanabe, et al., "Development of Parallel/Serial Program Analyzing Tool", [§3.6 Prediction Function of Acceleration Ratio and Parallel Efficiency Ratio], Mar. 1999, Japan Atomic Energy Research Institute, Data/Code 99-014.

* cited by examiner

PARALLEL EFFICIENCY CALCULATING METHOD AND APPARATUS

TECHNICAL FIELD OF THE INVENTION

This invention relates to a performance evaluation technique for parallel computer systems.

BACKGROUND OF THE INVENTION

The conventional evaluation of the performance of a parallel computer system has been carried out by determining a parallel efficiency $E_{para}(p, n)$ as follows:

$$E_{para}(p, n) \equiv \frac{\tau(1 \cdot n)}{\tau(p, n) \cdot p} \quad (1)$$

wherein p represents the number of processors; and n the size of a problem. In order to determine a parallel efficiency $E_{para}(p, n)$ in accordance with the expression (1), it is necessary that sequential processing time $\tau(1, n)$, which is a processing time during which the sequential processing is carried out, and parallel processing time $\tau(p, n)$, which is a processing time during which the parallel processing is carried out, be measured individually, If the parallel processing time $\tau(p, n)$ becomes long, it becomes difficult in some cases to measure the sequential processing time $\tau(1, n)$, which becomes longer than the parallel processing time, In addition, if this parallel efficiency $E_{para}(p, n)$ is low, i.e., if the performance of parallel processing is low, it is necessary to specify causes of hampering the improvement of the performance to improve, Therefore, it was necessary to further conduct measurement not less than one time to specify the causes of hampering the improvement of the performance with respect to the parallel processing and to determine their percentages.

In the conventional evaluation method, the quantitative relation between the causes of hampering the improvement of the performance and the parallel efficiency was not clear, so that it was difficult to determine how much each cause of hampering the improvement of the performance lowers the parallel efficiency.

SUMMARY OF THE INVENTION

Therefore, an object of the present invention is to provide a technique for clarifying the causes of hampering the improvement of the performance of the parallel computer system by quantitatively associating a value of the parallel efficiency with the causes.

In addition, another object of the present invention is to provide a technique for enabling the parallel efficiency to be calculated by conducting one measurement.

Furthermore, another object of the present invention is to provide a technique for enabling the parallel efficiency to be calculated with higher accuracy.

In addition, another object of the present invention is to provide a technique for enabling the evaluation of the performance of a parallel computer system to be made easily, and the time needed for the evaluation to be reduced.

A method of calculating a parallel efficiency of a parallel computer system according to a first aspect of the present invention includes the steps of: obtaining and storing into a storage device, first information concerning the processing time (for example, $\alpha(p, n)$ in an embodiment) for a portion to be sequentially processed during the execution of a parallel processing program, second information concerning the processing time (for example, $\beta(p, n)/p$ in an embodiment) for a portion to be parallel processed during the execution of the parallel processing program, and third information concerning the processing time (for example, $\sigma(p, n)$ in an embodiment) caused by an overhead for the parallel processing; calculating and storing into a storage device, a paralleled rate (for example, $R_{para}(p, n)$ in an embodiment), a sequential calculation time ratio (for example, $R_\alpha(p, n)$ in an embodiment) and a parallel overhead ratio (for example, $R_\sigma(p, n)$ in an embodiment) by using the first information concerning the processing time for the portion to be sequentially processed, the second information concerning the processing time for the portion to be parallel processed and the third information concerning the processing time caused by the overhead for the parallel processing; and calculating and storing into a storage device, a parallel efficiency $E_{para}$ by using the parallelized rate, sequential calculation time ratio and parallel overhead ratio. Finally, the results of the calculations may be output to a display device and so on. In addition, the results of the calculations may be analyzed to specify the causes of hampering the improvement of the performance of the parallel computer system and to determine their percentages.

The first, second and third information may be a processing time or the number of times a phenomenon is confirmed. The phenomenon may be of the sequential processing, the parallel processing or the processing caused by the overhead for the parallel processing.

Since the parallel efficiency is expressed by indexes of the causes of hampering the improvement of the performance, which are the parallelized rate, the sequential calculation time ratio and the parallel overhead ratio, it becomes possible to identify the factors of hampering the improvement of the performance, by using values of these indexes and a value of the parallel efficiency, and thereby determine the measures to improve the performance.

In addition, the processing time for the portion to be sequentially processed, the processing time for the portion to be parallel processed and the processing time caused by the overhead for the parallel processing can be obtained by measuring the time with respect to one time execution of the processing. Therefore, it becomes possible to carry out the evaluation of the performance of the parallel computer easily, and reduce the time required for the evaluation.

The aforementioned step of calculating the parallel efficiency may be a step of calculating 1/(parallelized rate)× (1−(sequential calculation time ratio)−(parallel overhead ratio)), and storing the result as a parallel efficiency in a storage device.

The parallel efficiency calculation method according to a second aspect of the present invention includes the steps of: obtaining and storing into a storage device, first information concerning the processing time for a portion to be sequentially processed during the execution of a parallel processing program, second information concerning the processing time for a portion to be parallel processed during the execution of the parallel processing program and third information concerning total processing time of the parallel processing program; multiplying a value of the obtained second information by the number of processors, and storing the result as fourth information concerning the processing time (for example, $\beta(p, n)$ in an embodiment) in the sequential processing for the portion to be parallel processed during the execution of the parallel processing program into a storage device; calculating and storing into a storage device, a parallelized rate, a sequential calculation time ratio and a parallel overhead ratio by using at least the first information and second information; and calculating ((a value of the first information)+(a value of the fourth information))/((a value of the third information)×(the number of processors)), and storing the result as a parallel efficiency into a storage device. Finally, the results of the calculations may be shown on a display device and so on. In addition, the results of the calculations may be analyzed to specify the causes of hampering the improvement of the performance of the parallel computer system and to determine their percentage.

When this method is carried out, the parallel efficiency can be calculated by measuring the time and so on for one time execution of the processing. Therefore, it becomes possible to carry out the evaluation of the parallel computer easily, and reduce the time required for this evaluation, The improving of the accuracy of the calculation can also be effected.

The parallel efficiency calculation method according to a third aspect of the present invention includes the steps of: obtaining and storing into a storage device, first information concerning the processing time for a portion to be sequentially processed during the execution of a parallel processing program, second information concerning the processing time for a portion to be parallel processed during the execution of the parallel processing program and third information concerning the total processing time for the parallel processing program; calculating and storing into a storage device, a parallelized rate by using the first information and the second information; and calculating a product of an inverse of the parallelized rate, an inverse of a value of the third information and a value of the second information, and storing the calculation result as a parallel efficiency into a storage device. Finally, the results of the calculations may be shown on a display device and so on. In addition, the results of the calculations may be analyzed to specify the causes of hampering the improvement of the performance of the parallel computer system and to determine their percentages.

Even by this calculation method, the parallel efficiency can be calculated by measuring the time for one time execution of the processing, Therefore, it becomes possible to carry out the evaluation of the performance of the parallel computer easily, and reduce the time required for the evaluation.

The above-mentioned parallel efficiency calculation methods can be executed by a computer in which a special program is installed. In this case, the special program is stored in a storage medium or a storage device, for example, a flexible disk, a CD-ROM, a magneto-optical disk. a semiconductor memory and a hard disk. The program may also be distributed via networks and the like. The intermediate results of the processing are temporarily stored into a memory.

DETAIL DESCRIPTION OF THE PREFERRED EMBODIMENTS

[Principle of the Present Invention]

If the load imbalance does not exist, the relation among portions of the processing time of the parallel computer system is expressed as follows:

$$\tau(p, n)=\alpha(p, n)+\beta(p, n)/p+\sigma(p, n) \quad (2)$$

wherein p represents the number of processors; and n the size of a problem which means, for example, the number of particles in a particle simulation or the number of elements in a structural analysis, the value thereof reaching into the order of million in some cases at present and becoming larger as the years roll on. The $\alpha(p, n)$ represents the processing time for a portion to be sequentially processed in the parallel execution; $\beta(p, n)/p$ the processing time for a portion to be parallel processed in the parallel execution; and $\sigma(p, n)$ the processing time caused by an overhead for the parallel processing. Namely, the parallel processing time (which is also called total processing time in the parallel processing) $\tau(p, n)$ is the sum of the processing time for the portion to be sequentially processed, the processing time for the portion to be parallel processed and the processing time caused by an overhead for the parallel processing.

If the number of the processor is one, it is assumed that the processing time for a portion to be parallel processed becomes p times, wherein p is the number of processors, and the overhead for the parallel processing is lost, so that the processing time is expressed as follows:

$$\tau(1, n)=\alpha(p, n)+\beta(p, n) \quad (3)$$

Namely, the sequential processing time (which is also called total processing time in the sequential processing) $\tau(1, n)$ becomes equal to the sum of the processing time for a portion to be sequentially processed and the processing time for a portion to be parallel processed multiplied by the number of processors.

The following three indexes are employed as factors of determining the parallel performance.

$$\text{parallelized rate: } R_{para}(p, n)=\beta(p, n)/[\alpha(p, n)+\beta(p, n)] \quad (4)$$

$$\text{Sequential calculation time ratio:} R_\alpha(p, n)=\alpha(p, n)/\tau(p, n) \quad (5)$$

$$\text{Parallel overhead ratio: } R_\sigma(p, n)=\sigma(p, n)/\tau(p, n) \quad (6)$$

The parallelized rate $R_{para}(p, n)$ is obtained by dividing the processing time, which is obtained by multiplying the processing time for a portion to be parallel processed by the number of the processors in sequential processing for a portion to be parallel processed, by the sum of the sequential processing time and the processing time in sequential processing for the portion to be parallel processed. A larger value (closer to one) of the parallelized rate $R_{para}(p, n)$ indicates that a percentage at which a parallel processing is carried out is high. The sequential calculation time ratio $R_\alpha(p, n)$ is obtained by dividing the processing time for the portion to be sequentially processed, by the parallel processing time. A larger value of this sequential calculation time ratio $R_\alpha(p, n)$ indicates that a percentage of the processing time for the portion to be sequentially processed, which cannot be parallel processed, is higher. The parallel overhead ratio $R_o(p, n)$ is obtained by dividing the processing time caused by the overhead for the parallel processing, by the parallel processing time. A larger value of the parallel overhead ratio $R_o(p, n)$ indicates that a percentage of the processing time caused by the overhead for the parallel processing is higher.

If the expressions (2)–(6) are substituted for the expression (1) shown in the column of "BACKGROUND OF THE INVENTION", the parallel efficiency $E_{para}(p, n)$ is transformed as follows:

$$E_{para}(p, n) = \frac{1}{R_{para}(p, n)} \cdot (1 - R_\alpha(p, n) - R_\sigma(p, n)) \quad (7)$$

Looking at the right side of the expression (7), it is understood that the parallel efficiency $E_{para}(p, n)$ becomes equal to a value obtained by multiplying an inverse of the parallelized rate $R_{para}(p, n)$ by a value obtained by subtracting the sequential calculation time ratio $R_\alpha(p, n)$ and parallel overhead ratio $R_o(p, n)$ from one. Thus, it has become possible to quantitatively express the parallel efficiency $E_{para}(p, n)$ by only three indexes of the causes of hampering the improvement of the performance, which include the parallelized rate $R_{para}(p, n)$, sequential calculation time ratio $R_\alpha(p, n)$ and parallel overhead ratio $R_o(p, n)$.

The expression (7) can also be transformed into the following expressions.

$$E_{para}(p, n) = \frac{1}{R_{para}(p, n)} \cdot \frac{1}{\tau(p, n)} \cdot \frac{\beta(p, n)}{p} \quad (8)$$

$$E_{para}(p, n) \equiv \frac{\alpha(p, n) + \beta(p, n)}{\tau(p, n) \cdot p} \quad (9)$$

The right side of the expression (8) shows that a parallel efficiency $E_{para}(p, n)$ is calculated by determining a product of an inverse of a parallelized rate $R_{para}(p, n)$, an inverse of parallel processing time $\tau(p, n)$ and processing time $\beta(n, n)/p$ for a portion to be parallel processed.

The right side of the expression (9) shows that a parallel efficiency $E_{para}(p, n)$ is calculated by dividing the sum of the processing time $\alpha(p, n)$ for a portion to be sequentially processed and the processing time $\beta(p, n)$ in the sequential processing for a portion to be parallel processed by the parallel processing time $\tau(p, n)$ and the number of the processors p. From the viewpoint of the calculation accuracy, it has been known that the expression (9) is the most preferable.

DESCRIPTION OF EMBODIMENTS

Figure 1:
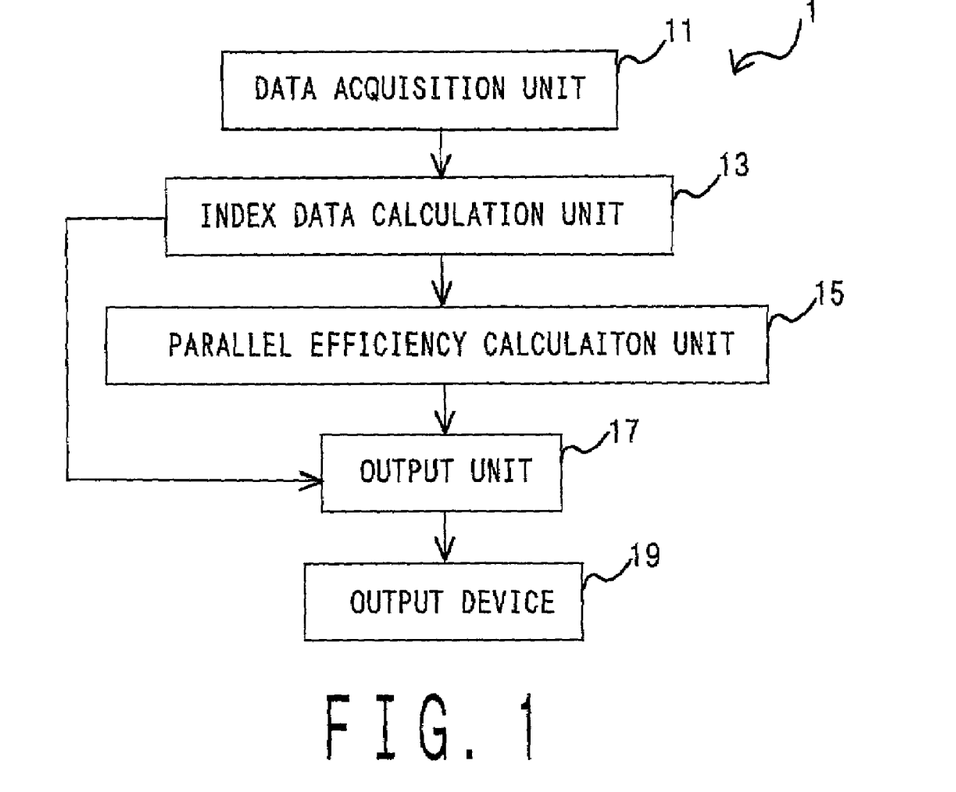
FIG. 1 is a block diagram of a first embodiment of the present invention.

An embodiment for implementing the principle of the above-described invention will now be described. FIG. 1 is a functional block diagram of a computer 1, a parallel efficiency calculation apparatus for calculating a parallel efficiency of a parallel computer system, Although the computer 1 may be a parallel computer system, it may also be a computer having one processor. The parallel computer system may be of a distributed memory type, or of a SMP (Symmetric Multi-processor) type in which memories are shared by processors.

The computer 1 includes a data acquisition unit 11, an index data calculation unit 13, a parallel efficiency calculation unit 15, an output unit 17, and an output device 19 such as a display device, a printer and so on. The data acquisition unit 11 obtains the processing time $\alpha(p, n)$ for a portion to be sequentially processed, processing time $\beta(p, n)/p$ for a portion to be parallel processed, processing time $\sigma(p, n)$ caused by an overhead for the parallel processing, parallel processing time $\tau(p, n)$ and the number of the processors p. The number of the processors p is obtained from an input from a user or a parallel computer system itself to be evaluated. Although the obtainment of time information is referred to above, it is also possible to use an appearance frequency of each of phenomena of sequential processing, parallel processing and processing caused by an overhead of the parallel processing (which will hereinafter be referred to as a sampling case). For example, an appearance frequency is obtained by confirming the execution status in every predetermined sampling cycle in an execution period of a parallel processing program, and counting the appearance number of times for each phenomenon. The reason why an appearance frequency can be used in this manner is that the parallelized rate $R_{para}(p, n)$, sequential calculation time ratio $R_\alpha(p, n)$ and parallel overhead ratio $R_o(p, n)$ appearing in the expressions (7), (8) and (9), the portion of the expression (8) which is other than an inverse of $R_{para}(p, n)$, and the expression (9) itself have a shape of time ratio. It is possible that a difference in measuring accuracy may occur between a case where time information is used and a sampling case.

In the case where the time information is used, it can be obtained by sandwiching, for example, each portion to be processed between timers, and conducting the measurement of time actually. Namely, while a parallel processing program is executed, time at a starting stage of each processing portion is recorded into a memory, and time at an ending stage thereof is also recorded into a memory. Then, the period of time for each processing portion can be obtained by calculating a difference between the time in the starting stage and that in the ending stage in the data acquisition unit 11. The data acquisition unit 11 can obtain the processing time $\alpha(p, n)$ for the portion to be sequentially processed, processing time $\beta(p, n)$ for the portion to be parallel processed and processing time $\sigma(p, n)$ caused by an overhead for the parallel processing by finally totalizing each of the processing time for the portion to be sequentially processed, processing time for the portion to be parallel processed and processing time caused by the overhead for the parallel processing. When the sum of the processing time $\alpha(p, n)$ for the portion to be sequentially processed, processing time $\beta(p, n)/p$ for the portion to be parallel processed and processing time $\sigma(p, n)$ caused by the overhead for the parallel processing is calculated; the data acquisition unit 11 can obtain the parallel processing time $\tau(p, n)$. The parallel processing time $\tau(p, n)$ can also be obtained by recording the processing starting time and processing ending time, and calculating a difference therebetween.

In the sampling case, a phenomenon (which is sequential processing. parallel processing or processing caused by the overhead for the parallel processing) in a parallel processing program being executed is identified at predetermined time intervals, and the appearance number of times is counted for every phenomenon. The identification and counting of the phenomenon are performed by the hardware or a program of the parallel computer system. For example, (1) as for the phenomenon of the sequential processing, (a) when the processing for a portion to be sequentially processed in a parallel processing program is executed, a flag showing the portion to be sequentially processed is set, and, when this flag is set at the time of confirmation of the execution status during the execution of the parallel processing program, a count concerning the sequential processing is incremented by one. (b) A count value concerning the sequential processing can also be obtained by subtracting a count value concerning a parallel processing and that concerning a processing caused by the overhead for the parallel processing from a total count value.

(2) As for the phenomenon of the parallel processing, following methods may be employed. (a) Programming is performed so as to set a flag showing a portion to be parallel processed when the processing of the portion to be parallel processed in the parallel processing program is executed, and when this flag is set at the time of confirmation of the execution status during the execution of the parallel processing program, a count concerning the parallel processing is incremented by one. (b) The compilation is carried out by a compiler and a tool recognizing parallelizing compiler directives, so that a flag concerning the parallel processing is set during the time of executing the parallel processing, and, when this flag is set at the time of confirmation of the execution status during the execution of the parallel processing program, a count concerning the parallel processing is incremented by one. (c) Furthermore, the compilation is carried out by a compiler and a tool recognizing a parallel language extension, so that a flag concerning the parallel processing is set during the parallel processing, and, when this flag is set at the time of confirmation of the execution status during the execution of the parallel processing program, a count concerning the parallel processing is incremented by one. (d) In addition, when the compiler automatically judges during the compilation that the parallel processing should be executed, the compilation is carried out so that a flag concerning the parallel processing is set during the parallel processing. When this flag is set at the time of the confirmation of the execution status of the parallel processing program being executed, a count concerning the parallel processing is incremented by one. (e) The names of modules to be parallel executed are listed, and the names of modules are identified at the time of confirmation of the execution status of the parallel processing program being executed. If the parallel processing is being executed, a count concerning the parallel processing is incremented by one. (f) The names of events to be parallel executed are listed, and the names of events are identified at the time of confirmation of the execution status of the parallel processing program being executed. If the parallel processing is being executed, a count concerning the parallel processing operation is incremented by one.

(3) As for the phenomenon caused by the overhead for the parallel processing, following methods may be employed. (a) Programming is performed so as to set a flag showing the range of a processing portion caused by the overhead for the parallel processing when the processing portion caused by the overhead in the parallel processing program is executed, and, when this flag is set at the time of confirmation of the execution status of the parallel processing program being executed, a count concerting the processing caused by the overhead for the parallel processing is incremented by one. (b) The compilation is carried out by a compiler and a tool recognizing compiler directives for parallel overhead such as communication, synchronization, and task creation, so that a flag concerning the processing caused by the overhead for the parallel processing is set at the time of execution of the parallel overhead processing and, when this flag is set at the time of confirmation of the execution status of the parallel processing program being executed, a count concerning the processing caused by the overhead for the parallel processing is incremented by one. (c) The compilation is carried out by a compiler and a tool recognizing a parallel language extension so that a flag concerning the processing caused by the overhead for the parallel processing is set at the time of execution of the parallel overhead processing, and, when this flag is set at the time of confirmation of the execution status of the parallel processing program being executed, a count concerning the processing caused by the overhead for the parallel processing is incremented by one. (d) The name of a library relating to parallel processing is identified, and, when the library is executed, a count concerning the processing caused by the overhead operation for the parallel processing is incremented by one. (e) The compiler automatically identifies the processing caused by the overhead for the parallel processing during the compilation and compiles so as to set a flag concerning the processing caused by the overhead for the parallel processing at the time of execution of the processing. When this flag is set at the time of confirmation of the execution status of the parallel processing being executed, a count concerning the processing caused by the overhead for the parallel processing is incremented by one. (f) The names of modules used for communication are listed, and the names of modules are identified at the confirmation of the execution status of the parallel processing program being executed. When the communication processing is performed, a count concerning the processing caused by the overhead for the parallel processing is incremented by one. (g) The names of communication events are listed, and the name of an event is identified at the time of confirmation of the execution status of the parallel processing program being executed. When the event for the communication processing is performed, a count concerning the processing caused by the overhead for the parallel processing is incremented by one.

In any of these cases, the counting may not be directly performed during the execution of the parallel processing program. But a history for the flag, modules, or event may be maintained and the counting may be performed by identifying the phenomena at predetermined intervals afterwards.

The index data calculation unit 13 calculates the parallelized rate $R_{para}(p, n)$, sequential calculation time ratio $R_\alpha(p, n)$ and parallel overhead ratio $R_o(p, n)$ in accordance with the expressions (4), (5) and (6) by using the processing time $\alpha(p, n)$ for the portion to be sequentially processed, processing time $\beta(p, n)/p$ for the portion to be parallel processed, processing time $\sigma(p, n)$ caused by the overhead for the parallel processing, parallel processing time $\tau(p, n)$ and the number p of processors, which are obtained in the data acquisition unit 11. The processing time $\beta(p, n)$ in the sequential processing for the portion to be parallel processed is determined by multiplying the processing time $\beta(p, n)/p$ for the portion to be parallel processed, by the number p of processors, and this value is also used.

The parallel efficiency calculation unit 15 calculates the parallel efficiency $E_{para}(p, n)$ in accordance with the expression (7) by using the parallelized rate $R_{para}(p, n)$, sequential calculation time ratio $R_\alpha(p, n)$ and parallel overhead ratio $R_o(p, n)$ that are calculated by the index data calculation unit 13.

The output unit 17 in this embodiment outputs the parallelized rate $R_{para}$, sequential calculation time ratio $R_\alpha(p, n)$ and parallel overhead ratio $R_o(p, n)$ which are calculated by the index data calculation unit 13, and parallel efficiency $E_{para}(p, n)$ calculated by the parallel efficiency calculation unit 15 to an output device, such as a display device and a printer.

Next, an example of a processing flow of the computer 1 will be explained by using FIG. 2. First, the data acquisition unit 11 of the computer 1 obtains the number p of processors, processing time $\alpha(p, n)$ for the portion to be sequentially processed, processing time $\beta(p, n)/p$ for the portion to be parallel processed, processing time $\sigma(p, n)$ caused by the overhead for the parallel processing and parallel processing time $\tau(p, n)$, and stores these data into a storage device, such as a main memory (Step S1). The data acquisition unit 11, for example, calculates the processing time $\beta(p, n)$ in sequential processing for the portion to be parallel processed, by multiplying the processing time $\beta(p, n)/p$ for the portion to be parallel processed by the number p of processors, and stores the results into the storage device (Step S3), Next, the index data calculation unit 13 calculates the parallelized rate $R_{para}(p, n)$ in accordance with the expression (4), and stores the results of the calculation into a storage device (Step S5), The index data calculation unit 13 calculates the sequential calculation time ratio $R_\alpha(p, n)$ in accordance with the expression (5), and stores the results of the calculation into a storage device (Step S7). The index data calculation unit 13 further calculates the parallel overhead ration $R_o(p, n)$ in accordance with the expression (6), and stores the results of the calculation into a storage device (Step S9). The order of executing the steps S5–S9 is arbitrarily set.

The parallel efficiency calculation unit 15 calculates the parallel efficiency $E_{para}(p, n)$ in accordance with the expression (7) by using the parallelized rate $R_{para}(p, n)$, sequential calculation time ratio $R_\alpha(p, n)$ and parallel overhead ratio $R_o(p, n)$, which are calculated in the steps S5–S9, and stores the results into a storage device (Step S11). The output unit 17 outputs the parallelized rate $R_{para}(p, n)$, sequential calculation time ratio $R_\alpha(p, n)$, parallel overhead ratio $R_o(p, n)$ and parallel efficiency $E_{para}(p, n)$, which were calculated in steps S5–S11 to the display device or printer (step S13).

This enables a user to obtain the parallel efficiency and discuss qualitatively the contribution of the parallelized rate, sequential calculation time ratio and parallel overhead ratio, which are indexes of factors of hampering the improvement of the performance, to the parallel efficiency, simultaneously.

Figure 2:
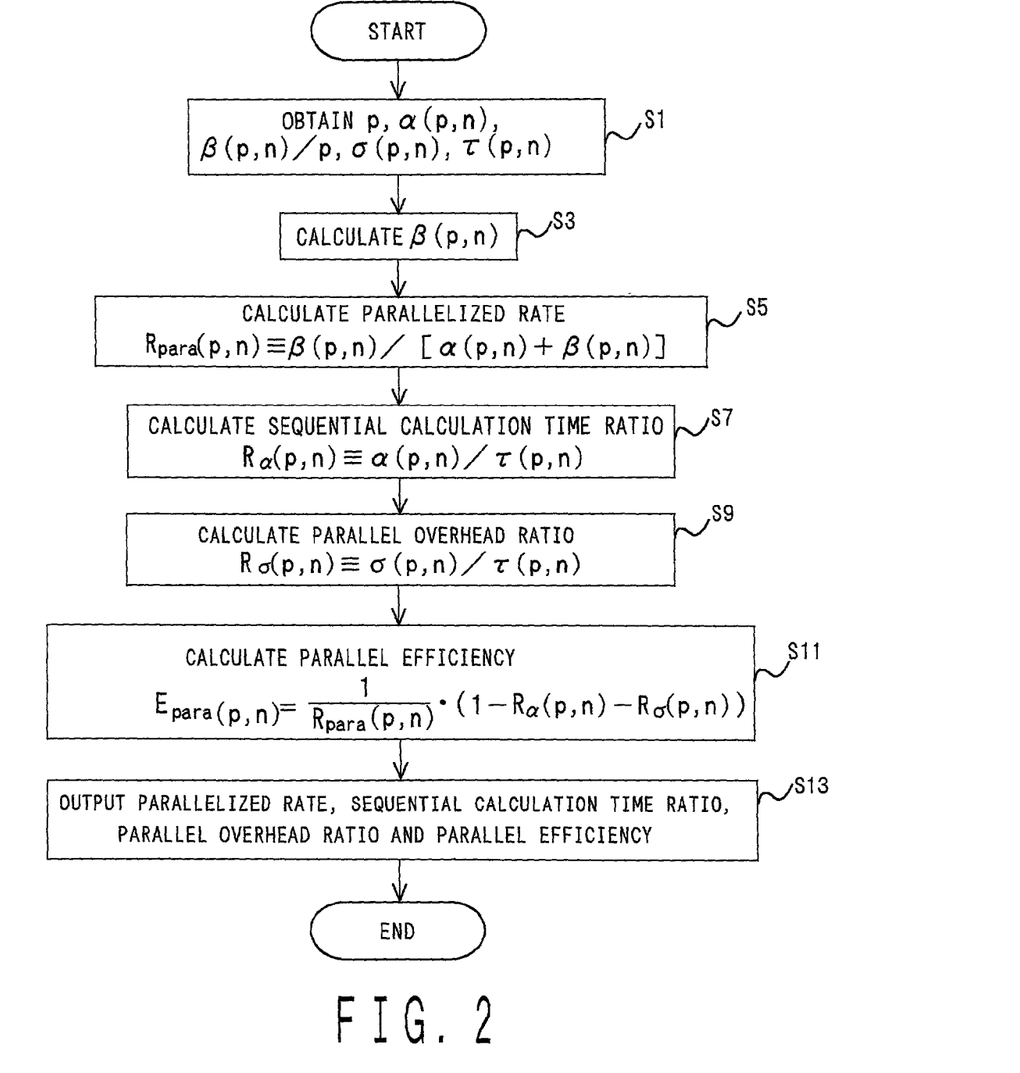
FIG. 2 is a diagram showing a processing flow for calculating a parallel efficiency in the first embodiment.

FIGS. 1 and 2 show a function block and a processing flow in a case in which a parallel efficiency is calculated in accordance with the expression (7). A function block and a processing flow in a case in which the parallel efficiency is calculated in accordance with the expression (9) will now be described with reference to FIGS. 3 and 4. Although the expression (9) does not show the relation between the parallel efficiency and the parallelized rate, the sequential calculation time and the parallel overhead ratio, it is experientially known that this expression enables the calculation of the parallel efficiency to be made with high accuracy.

Figure 3:
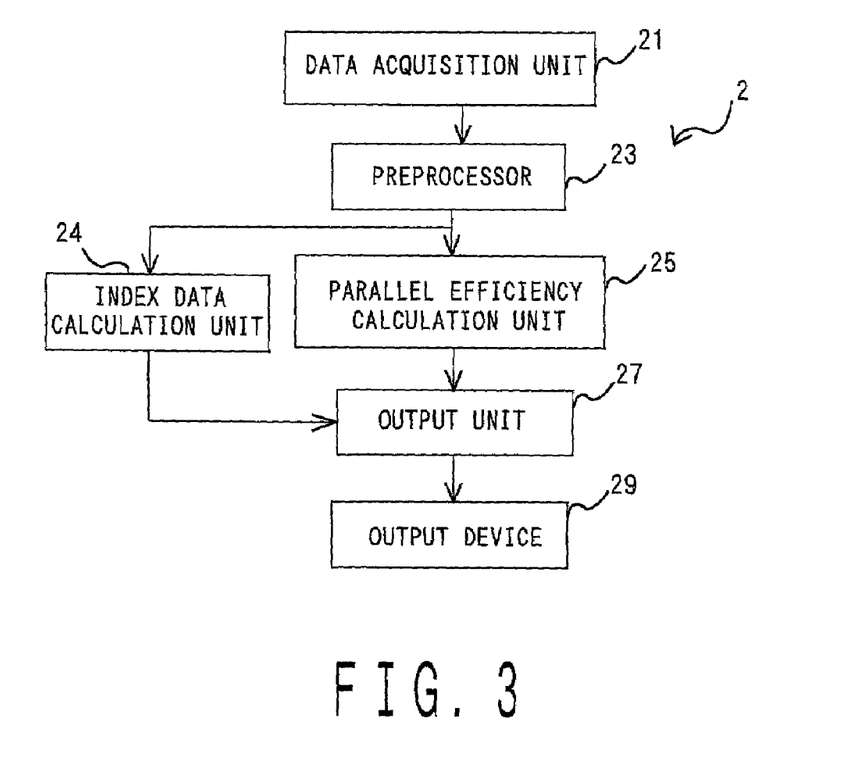
FIG. 3 is a block diagram of a second embodiment of the present invention.

FIG. 3 is a function block diagram of a computer 2, which is a parallel efficiency calculation apparatus for calculating a parallel efficiency of a parallel computer system. The computer 2 includes a data acquisition unit 21, a preprocessor 23, an index data calculation unit 24, a parallel efficiency calculation unit 25, an output unit 27 and an output device 29 such as a display device, and a printer. The data acquisition unit 21 performs the same processing as the data acquisition unit 11 shown in FIG. 1. The preprocessor 23 calculates processing time $\beta(p, n)$ in sequential processing for the portion to be parallel processed, by multiplying processing time $\beta(p, n)/p$ for the portion to be parallel processed, by the number p of processors. The index data calculation element 24 calculates a parallelized rate $R_{para}(p, n)$, a sequential calculation time ratio $R_\alpha(p, n)$ and a parallel overhead ratio $R_o(p, n)$, in accordance with the expressions (4), (5) and (6) by using processing time $\alpha(p, n)$ for a portion to be sequentially processed, processing time $\sigma(p, n)$ caused by the overhead for the parallel processing and parallel processing time $\tau(p, n)$, which are obtained by the data acquisition unit 21, and $\beta(p, n)$ calculated by the preprocessor 23. The parallel efficiency calculation unit 25 calculates a parallel efficiency $E_{para}(p, n)$ in accordance with the expression (9) by using the processing time $\alpha(p, n)$ for the portion to be sequentially processed, parallel processing time $\tau(p, n)$ and number p of processors, which are obtained by the data acquisition unit 21, and processing time $\beta(p, n)$ in sequential processing for the portion to be parallel processed, calculated by the preprocessor 23. The output unit 27 outputs the parallel efficiency $R_{para}(p, n)$ calculated by the parallel efficiency calculation unit 25, and parallelized rate $R_{para}(p, n)$, sequential calculation time ratio $R_\alpha(p, n)$ and parallel overhead ratio $R_o(p, n)$, which are calculated by the index data calculation unit 24 to a display device or a printer.

Figure 4:
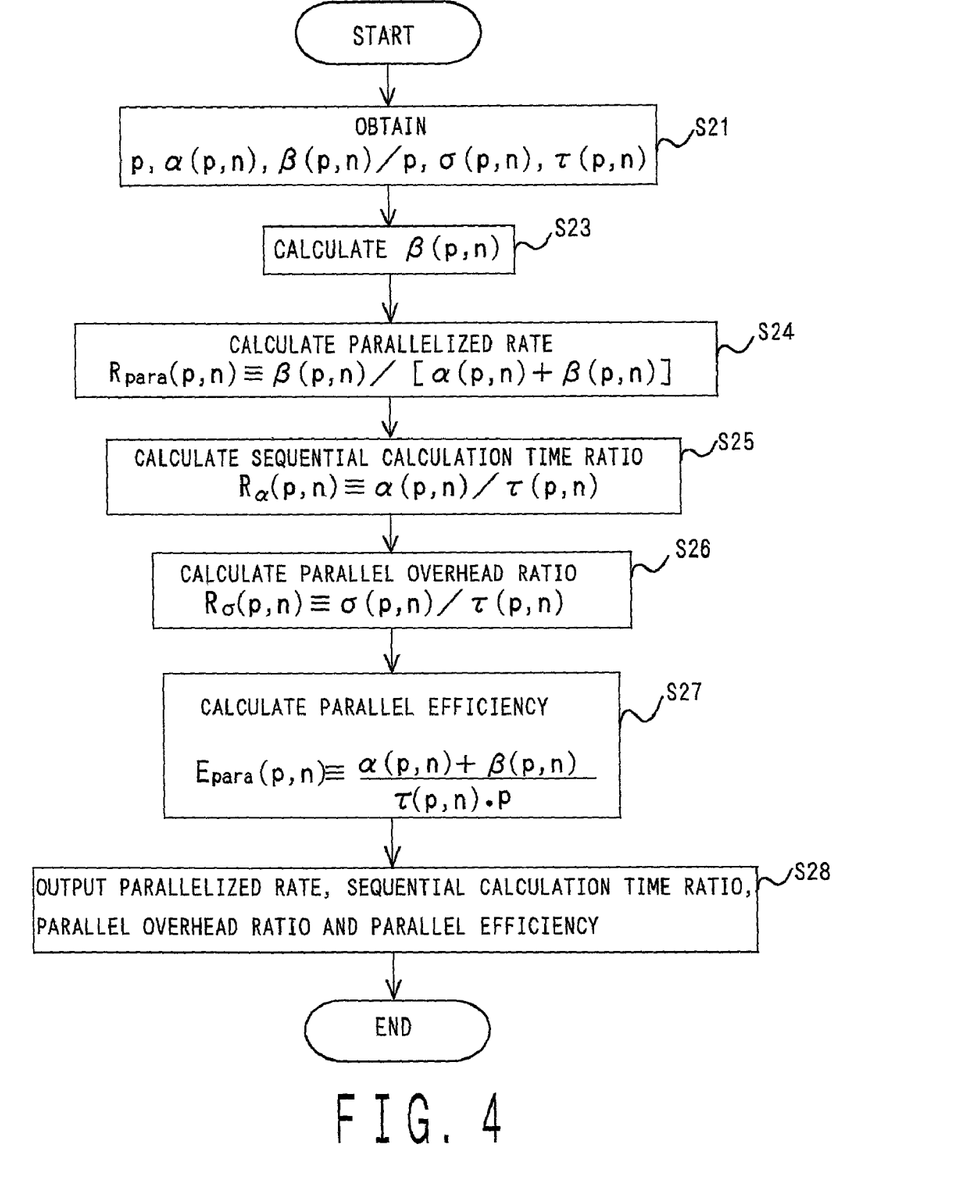
FIG. 4 is a diagram showing a processing flow for calculating a parallel efficiency in the second embodiment.

An example of a processing flow in a case in which the parallel efficiency $E_{para}(p, n)$ is calculated by using the expression (9) is shown by using FIG. 4. The data acquisition unit 21 obtains the number p of processors, processing time $\alpha(p, n)$ for the portion to be sequentially processed, processing time $\beta(p, n)/p$ for the portion to be parallel processed, processing time $\sigma(p, n)$ caused by the overhead for the parallel processing and parallel processing time $\tau(p, n)$, and stores these pieces of information into a storage device such as a main memory (Step S21). The preprocessor 23 calculates processing time $\beta(p, n)$ in sequential processing for the portion to be parallel processed, by multiplying the processing time $\beta(p, n)/p$ for the portion to be parallel processed, by the number p of processors, and store the results into a storage device (Step S23). Then, the index data calculation unit 24 calculates the parallelized rate $R_{para}(p, n)$ in accordance with the expression (4), and stores the results of calculation into a storage device (Step S24). The index data calculation unit 24 calculates the sequential calculation time ratio $R_\alpha(p, n)$ in accordance with the expression (5), and stores the results of calculation into a storage device (Step S25). The index data calculation unit 24 further calculates the parallel overhead ratio $R_o(p, n)$ in accordance with the expression (6), and stores the results of the calculation into a storage device (Step S26). The order of executing the steps S24–S26 is arbitrarily determined.

A configuration in which the steps are executed in parallel with the step S27 can also be employed.

The parallel efficiency calculation unit 25 calculates the parallel efficiency $E_{para}(p, n)$ in accordance with the expression (9) by using the processing time $\alpha(p, n)$ for the portion to be sequentially processed, parallel processing time $\tau(p, n)$ and number p of processors. which are obtained by the data acquisition unit 21, and processing time $\beta(p, n)$ in sequential processing for the portion to be parallel processed, which was calculated by the preprocessor 23, and stores the results into a storage device (step S27). The output unit 27 outputs the parallelized rate $R_{para}(p, n)$, sequential calculation time ratio $R_\alpha(p, n)$, parallel overhead ratio $R_o(p, n)$ and parallel efficiency $E_{para}(p, n)$, which were calculated in the steps S24–S27 to a display device or a printer (step S28).

This enables a user to obtain the parallel efficiency of a parallel computer system simply by one measurement in a shorter period of time, It also becomes possible to quantitatively discuss the contribution of the parallelized rate, the sequential calculation time ratio and the parallel overhead ratio, which are indexes of the factors of hampering the improvement of the performance, to the parallel efficiency. Furthermore, the calculation accuracy of the parallel efficiency becomes equal to or higher than that of the expressions (7) and (8).

Figure 5:
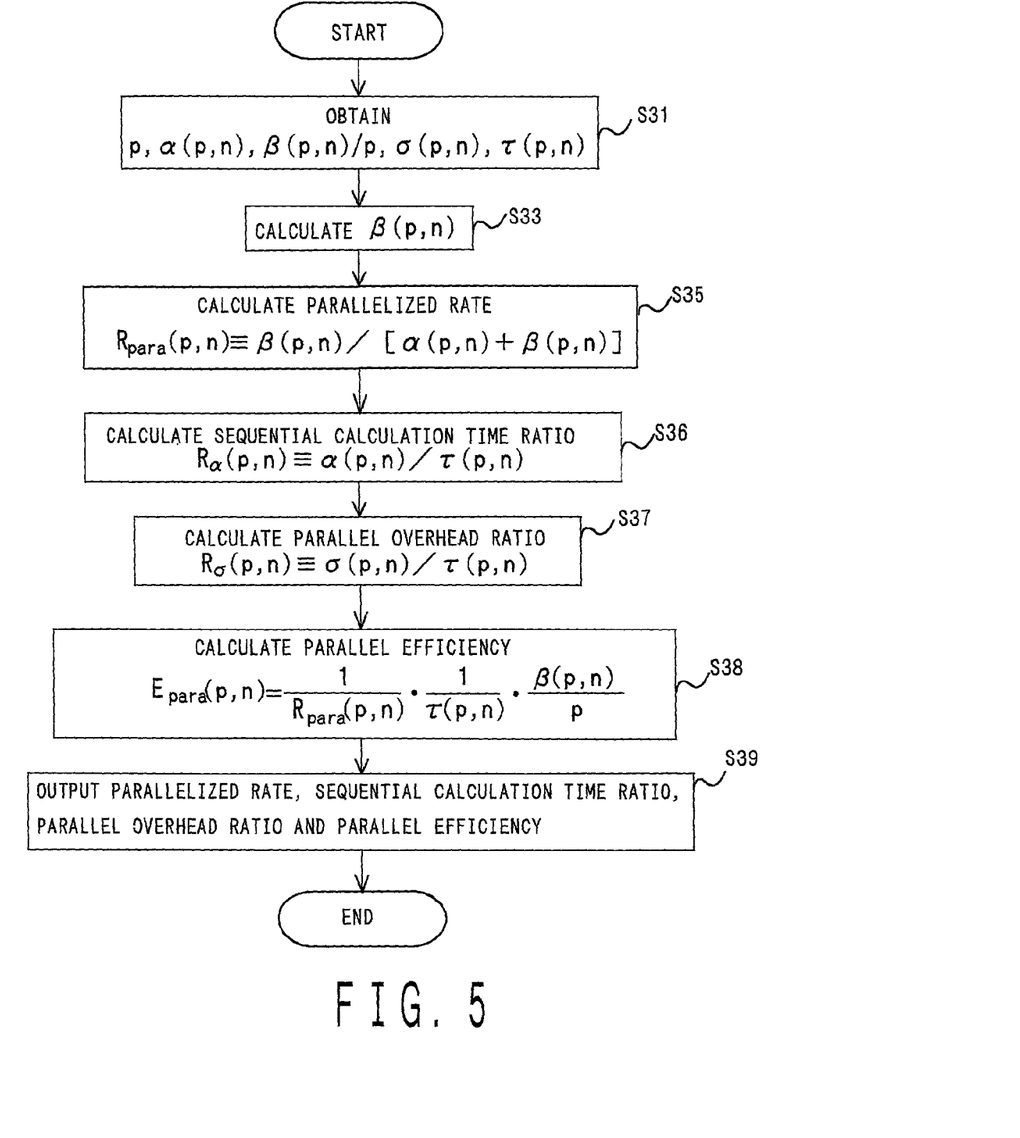
FIG. 5 is a diagram showing a processing flow for calculating a parallel efficiency in a third embodiment.

Next, an example of a processing flow in a case in which the parallel efficiency is calculated in accordance with the expression (8) will now be described by using FIG. 5. A function block diagram of a computer constituting the parallel efficiency calculation apparatus in this case is identical with that of FIG. 1. However, the parallel efficiency calculation unit 15 is adapted to calculate the parallel efficiency in accordance with the expression (8).

A data acquisition unit 11 obtains the number p of processors, processing time $\alpha(p, n)$ for a portion to be sequentially processed, processing time $\beta(p, n)/p$ for a portion to be parallel processed, processing time $\sigma(p, n)$ caused by the overhead for the parallel processing and parallel processing time $\tau(p, n)$, and stores these pieces of information in a storage device, such as a main memory (Step S31). The data acquisition unit 11 further calculates processing time $\beta(p, n)$ in sequential processing for the portion to be parallel processed, by multiplying the processing time $\beta(p, n)/p$ for the portion to be parallel processed by the number p of processors, and stores the results in the storage device (Step S33).

Next, the index data calculation unit 13 calculates a parallelized rate $R_{para}(p, n)$ in accordance with the expression (4), and stores the results of calculation into a storage device (Step S35). The index data calculation unit 13 also calculates a sequential calculation time ratio $R_\alpha(p, n)$ in accordance with the expression (5), and stores the results of the calculation into a storage device (Step S36). The index data calculation unit 13 further calculates a parallel overhead ratio $R_\sigma(p, n)$ in accordance with the expression (6), and stores the results of the calculation into a storage device (Step S37). The order of executing the steps S35–S37 is arbitrarily determined. A configuration in which these steps are executed in parallel with the step S38, which will be described below, can also be employed. The parallel efficiency calculation unit 15 calculates the parallel efficiency $E_{para}(p, n)$ in accordance with the expression (8) by using the parallelized rate $R_{para}(p, n)$ calculated by the index data calculation unit 13 and the parallel processing time $\tau(p, n)$ and processing time $\beta(p, n)/p$ for the portion to be parallel processed, which were obtained in the data acquisition unit 11, and stores the result into a storage device (Step S38). The output unit 17 outputs the parallelized rate $R_{para}(p, n)$, sequential calculation time ratio $R_\alpha(p, n)$, parallel overhead ratio $R_\sigma(p, n)$, and parallel efficiency $E_{para}(p, n)$, which were calculated in steps S35–S38, to a display device or a printer (step S39).

This enables a user to obtain the parallel efficiency of a parallel computer system simply by one measurement in a short period of time. Moreover, it becomes possible to obtain the parallel efficiency and discuss the contribution of the parallelized rate, sequential calculation time ratio and parallel overhead ratio, which are indexes of the factors of hampering the improvement of the performance, to the parallel efficiency.

An embodiment of the present invention is explained in the above but the present invention is not limited to this embodiment. For example, the block diagrams of FIGS. 1 and 3 do not necessarily correspond to program modules, and the modularization may be carried out by using a different dividing method. The steps of the processing flows can be executed simultaneously or by changing the order in some cases.

CONCRETE EXAMPLE 1

In a case in which, by measuring the period of time, the processing time $\alpha(p, n)$ for the portion to be sequentially processed is 8 hours, the processing time $\beta(p, n)/p$ for the portion to be parallel processed 14 hours, the processing time $\sigma(p, n)$ caused by an overhead for the parallel processing 10 hours, and the number of processors 100, the parallelized rate and the like are calculated as follows:

$$\beta(p, n) = \beta(p, n)/p * p = 14*100 = 1400$$

$$R_{para}(p, n) \equiv \beta(p, n)/[\alpha(p, n) + \beta(p, n)] = 1400/[8+1400]$$
$$= 0.994$$

$$R_\alpha(p, n) \equiv \alpha(p, n)/\tau(p, n) = 8/(8+14+10) = 0.25$$

$$R_\sigma(p, n) \equiv \sigma(p, n)/\tau(p, n) = 10/(8+14+10) = 0.313$$

When these values are substituted for the expression (7), the parallel efficiency is determined as follows:

$$E_{para}(p, n) = (1 - 0.25 - 0.313)/0.994 = 0.440$$

When the expression (8) is used, the following value is obtained.

$$E_{para}(p, n) = 14/[0.994*(8+14+10)] = 0.440$$

When the expression (9) is used, the following value is obtained.

$$E_{para}(p, n) = (8+1400)/[(8+14+10)*100] = 0.440$$

CONCRETE EXAMPLE 2

In the sampling case, if the number of counts for the sequential processing is 8, the number of counts for the parallel processing 14, the number of counts for the processing caused by the overhead for the parallel processing 10, and the number of processors 100, the parallelized rate and the like are calculated as follows:

$$\beta(p, n) = \beta(p, n)/p * p = 14*100 = 1400$$

$$R_{para}(p, n) \equiv \beta(p, n)/[\alpha(p, n) + \beta(p, n)] = 1400/[8+1400]$$
$$= 0.994$$

$$R_\alpha(p, n) \equiv \alpha(p, n)/\tau(p, n) = 8/(8+14+10) = 0.25$$

$$R_\sigma(p, n) \equiv \sigma(p, n)/\tau(p, n) = 10/(8+14+10) = 0.313$$

When these values are substituted for the expression (7), the parallel efficiency is determined as follows:

$$E_{para}(p, n) = (1 - 0.25 - 0.313)/0.994 = 0.440$$

When the expression (8) is used, the following value is obtained.

$$E_{para}(p, n) = 14/[0.994*(8+14+10)] = 0.440$$

When the expression (9) is used, the following value is obtained.

$$E_{para}(p, n) = (8+1400)/[(8+14+10)*100] = 0.440$$

Thus, the results identical with those obtained in the case of the time measurement are obtained.

CONCRETE EXAMPLE 3

If p=10, and the processing time $\alpha(p, n)$ for the portion to be sequentially processed, processing time $\beta(p, n)/p$ for the portion to be parallel processed, processing time $\sigma(p, n)$ caused by the overhead for the parallel processing and parallel processing time $\tau(p, n)$ are measured as 100 minutes, 1 minute, 1 minute and 102 minutes, respectively, $\beta(p, n)=1*10=10$. When these values are substituted for the expressions (4), (5) and (6), the following values are obtained.

$$R_{para}(p, n)=10/(100+10)=0.091$$

$$R_\alpha(p, n)=100/102=0.980$$

$$R_\sigma(p, n)=1/102=0.0098$$

When the parallel efficiency is calculated in accordance with, for example, the expression (9), the following value is obtained.

$$E_{para}(p, n)=(100+10)/120/10=0.108$$

When the performance of the parallel processing is evaluated on the basis of these values, it is understood that the factor of hampering the performance is the large value of $R_\alpha(p, n)$. Since the value of $R_{para}(p, n)$ is small, it is also understood that the increase of the number of processors does not cause $R_\alpha(p, n)$ to appear relatively large, and even when p=2, the performance of the parallel processing is not improved. For example, the output unit 17 or 27 may perform these analysis for the causes of hampering the performance, and output to the output device 19 or 29 to also display or print the result of the analysis.

CONCRETE EXAMPLE 4

If p=10, and the processing time $\alpha(p, n)$ for a portion to be sequentially processed, processing time $\beta(p, n)/p$ for a portion to be parallel processed, processing time $\sigma(p, n)$ caused by an overhead for the parallel processing and parallel processing time $\tau(p, n)$ measured as 1 minute, 100 minutes, 1 minute and 102 minutes respectively, $\beta(p, n)=100\times10=1000$. When these values are substituted for the expressions (4), (5) and (6), the following values are obtained.

$$R_{para}(p, n)=1000/(10+1000)=0.999$$

$$R_\alpha(p, n)=1/102=0.0098$$

$$R_\sigma(p, n)=1/102=0.0098$$

When the parallel efficiency is calculated in accordance with, for example, the expression (8), the following value is obtained.

$$E_{para}(p, n)=1/0.999*1/102*100=0.981$$

When the performance of the parallel processing is evaluated on the basis of these values, it is understood that the parallel processing is performed at a very high parallel efficiency of 0.981.

CONCRETE EXAMPLE 5

If p=10, and the processing time $\alpha(p, n)$ for a portion to be sequentially processed, processing time $\beta(p, n)/p$ for a portion to be parallel processed, processing time $\sigma(p, n)$ caused by an overhead for the parallel processing and parallel processing $\tau(p, n)$ are measured as 10 minutes, 10 minutes, 10 minutes and 30 minutes, respectively, $\beta(p, n)=10*10=100$. When these values are substituted for the expressions (4), (5) and (6), the following values are obtained.

$$R_{para}(p, n)=100/(10+100)=0.909$$

$$R_\alpha(p, n)=10/30=0.333$$

$$R_\sigma(p, n)=10/30=0.333$$

When the parallel efficiency is calculated in accordance with, for example, the expression (7), the following value is obtained.

$$E_{para}(p, n)=(1-0.333-0.333)/0.909=0.367$$

When the performance of the parallel processing performance is evaluated on the basis of these values, it is understood that the factors of hampering the parallel processing are $R_\alpha(p, n)$ and $R_\sigma(p, n)$, i.e. 0.333, and that the parallel processing is hampered at the same rate. For example, the output unit 17 or 27 may perform these analysis for the causes of hampering the performance, and output to the output device 19 or 29 to also display or print the result of the analysis.

CONCRETE EXAMPLE 6

If p=10, and the numbers of counts for the sequential processing, parallel processing, and processing caused by the overhead, and total number of counts are obtained by sampling as 10000, 100, 100 and 10200, respectively, $\beta(p, n)=100*10=1000$.

When these values are substituted for the expressions (4), (5) and (6), the following values are obtained.

$$R_{para}(p, n)=1000/(10000+1000)=0.091$$

$$R_\alpha(p, n)=10000/10200=0.980$$

$$R_\sigma(p, n)=100/10200=0.0098$$

When the parallel efficiency is calculated in accordance with, for example, the expression (9), the following value is obtained.

$$E_{para}(p, n)=(10000+1000)/10200/10=0.108$$

When the performance of the parallel processing is evaluated on the basis of this value, it is understood that the factor of hampering the parallel processing is the large value of $R_\alpha(p, n)$. Since the value of $R_{para}(p, n)$ is small, it is also understood the increase of the number of processors does not cause $R_\alpha(p, n)$ to appear relatively large, and that, even when p=2, the performance of parallel processing is not improved.

CONCRETE EXAMPLE 7

If p=10, and the numbers of counts for the sequential processing, the parallel processing and the processing caused by an overhead for the parallel processing and the total number of counts are obtained by sampling as 100, 1000, 100 respectively, and 10200, respectively, $\beta(p, n)=10000*10=100000$. When these values are substituted for the expressions (4), (5) and (6), the following values are obtained.

$$R_{para}(p, n)=100000/(100+100000)=0.999$$

$$R_\alpha(p, n)=100/10200=0.0098$$

$$R_\sigma(p, n)=100/10200=0.0098$$

When the parallel efficiency is calculated in accordance with, for example, the expression (8), the following value is obtained.

$$E_{para}(p, n)=1/0.999*1/10200*10000=0.981$$

When the performance of the parallel processing is evaluated on the basis of these values, it is understood that the parallel computer system performs the parallel processing at a high parallel efficiency of 0.981.

CONCRETE EXAMPLE 8

If p=10, and the numbers of counts for the sequential processing, the parallel processing and the processing caused by the overhead for the parallel processing and the total number of counts are obtained by sampling as 1000, 1000, 1000 and 3000, respectively, β(p, n)=1000× 10=10000. When these values are substituted for the expressions (4), (5) and (6), the following values are obtained.

$$R_{para}(p, n)=10000/(1000+10000)=0.909$$

$$R_{\alpha}(p, n)=1000/3000=0.333$$

$$R_{\sigma}(p, n)=1000/3000=0.333$$

When a parallel efficiency is calculated in accordance with, for example, the expression (7), the following value is obtained.

$$E_{para}(p, n)=(1-0.333-0.333)/0.909=0.367$$

When the performance of the parallel processing is evaluated on the basis of these values, it is understood that the factors of hampering the parallel processing are $R_{\alpha}(p, n)$ and $R_{\sigma}(p, n)$, i.e., 0.333. and that the parallel processing is hampered at the same rate.

As described above, the present invention is capable of providing a technique for clarifying the causes of hampering the performance, by qualitatively associating a value parallel efficiency with causes of hampering the improvement of the performance.

The present invention is also capable of providing the techniques for enabling the parallel efficiency to be calculated by one measurement result.

The present invention is further capable of providing the techniques for enabling the parallel efficiency to be calculated accurately.

The present invention is also capable of providing techniques for enabling the performance a parallel calculator system to be evaluated easily, and the time needed to carry out the evaluation to be reduced.

Although the present invention has been described with respect to a specific preferred embodiment thereof, various change and modifications maybe suggested to one skilled in the art, and it is intended that the present invention encompasses such changes and modifications as fall within the scope of the appended claims.

What is claimed is:

1. A computer-implemented method of calculating a parallel efficiency of a parallel computer system in which no load imbalance exists, comprising:

obtaining and storing into a storage a first value concerning a processing time for a portion to be sequentially processed during an execution of a parallel processing program, a second value concerning a processing time for a portion to be parallel processed during the execution of said parallel processing program, and a third value concerning a processing time caused by an overhead for parallel processing from a result of one measurement for said parallel processing program;

calculating and storing into said storage a parallelized rate, a sequential calculation time ratio that is defined as a ratio of said first value to a value concerning a total processing time during the execution of said parallel processing program, and a parallel overhead ratio by using said first value, said second value, and said third value; and calculating and storing into said storage a parallel efficiency by using said parallelized rate, said sequential calculation time ratio, and said parallel overhead ratio, wherein calculating said parallelized rate includes multiplying said second value by the number of processors to obtain a fourth value concerning a processing time in sequential processing for the portion to be parallel processed during the execution of said parallel processing program, and calculating (said fourth value)/(said first value+said fourth value) as said parallelized rate, and calculating said parallel efficiency includes calculating 1/(said parallelized rate)×(1−(said sequential calculation time ratio)−(said parallel overhead ratio)) as said parallel efficiency.

2. The computer-implemented method as set forth in claim 1, wherein said first value concerning the processing time for the portion to be sequentially processed is a number of times that sequential processing is performed, and is determined in a confirmation of execution status for each predetermined period during the execution of said parallel processing program, said second value concerning the processing time for the portion to be parallel processed is a number of times that parallel processing is performed, and is determined in the confirmation of the execution status for each predetermined period during the execution of said parallel processing program, and said third value concerning the processing time caused by the overhead for the parallel processing is a number of times that processing caused by the overhead for the parallel processing is performed, and is determined in the confirmation of the execution status for each predetermined period during the execution of said parallel processing program.

3. The computer-implemented method as set forth in claim 1, wherein said first calculating further includes dividing said third value by a value concerning a total processing time during the execution of said parallel processing program to obtain said parallel overhead ratio.

4. The computer-implemented method as set forth in claim 1, further comprising outputting said parallelized rate, said sequential calculation time ratio, said parallel overhead ratios and said parallel efficiency.

5. The computer-implemented method as set forth in claim 1, further comprising analyzing contribution of said parallelized rate, said sequential calculation time ratio, and parallel overhead ratio toward said parallel efficiency.

6. A computer-implemented method of calculating a parallel efficiency of a parallel computer system in which no load imbalance exists, comprising:

obtaining and storing into a storage a first value concerning a processing time for a portion to be sequentially processed during an execution of a parallel processing program, a second value concerning a processing time for a portion to be parallel processed during the execution of said parallel processing program, and a third value concerning a total processing time for said paralell processing program;

calculating and storing into said storage a parallelized rate, by using the obtained first value and the obtained second value; and calculating and storing into said storage a product of an inverse of said parallelized rate, an inverse of said third value, and said second value as a parallel efficiency, wherein calculating said parallelized rate includes multiplying said second value by the number of processors to obtain a fourth value concerning a processing time in sequential processing for the portion to be parallel processed during the execution of said paralell processing program, and calculating (said fourth value)/(said first value+said fourth value) as said parallelized rate.

7. A computer-readable storage medium storing a program for causing a computer to calculate a parallel efficiency of a parallel computer system in which no load imbalance exists, said program comprising:

obtaining and storing into a storage a first value concerning a processing time for a portion to be sequentially processed during an execution of a parallel processing program, a second value concerning a processing time for a portion to be parallel processed during the execution of said parallel processing program, and a third value concerning a processing time caused by an overhead for parallel processing from a result of one measurement for said parallel computer system;

calculating and storing into said storage a parallelized rate, a sequential calculation time ratio that is defined as a ratio of said first value to a value concerning a total processing time during the execution of said parallel processing program, and a parallel overhead ratio by using said first value, said second value, and said third value; and calculating and storing into said storage a parallel efficiency by using said parallelized rate, said sequential calculation time ratio, and said parallel overhead ratios wherein calculating said parallelized rate includes multiplying said second value by the number of processors to obtain a fourth value concerning a processing time in sequential processing for the portion to be parallel processed during the execution of said parallel processing program, and calculating (said fourth value)/(said first value+said fourth value) as said parallelized rate, and calculating said parallel efficiency includes calculating 1/(said parallelized rate)×(1−(said sequential calculation time ratio)−(said parallel overhead ratio)) as said parallel efficiency.

8. The computer-readable storage medium as set forth in claim 7, wherein said first value concerning the processing time for the portion to be sequentially processed is a number of times that sequential processing is performed, and is determined in a confirmation of execution status for each predetermined period during the execution of said parallel processing program, said second value concerning the processing time for the portion to be parallel processed is a number of times that parallel processing is performed, and is determined in the confirmation of the execution status for each predetermined period during the execution of said parallel processing program, and said third value concerning the processing time caused by the overhead for the parallel processing is a number of times that processing caused by the overhead for the parallel processing is performed, and is determined in the confirmation of the execution status for each predetermined period during the execution of said parallel processing program.

9. The computer-readable storage medium as set forth in claim 7, wherein said first calculating further includes dividing said third value by a value concerning a total processing time during the execution of said parallel processing program to obtain said parallel overhead ratio.

10. The computer-readable storage medium as set forth in claim 7, said program further comprising outputting said parallelized rate, said sequential calculation time ratio, said parallel overhead ratio, and said parallel efficiency.

11. The computer-readable storage medium as set forth in claim 7, said program further comprising analyzing contribution of said parallelized rate, said sequential calculation time ratio, and parallel overhead ratios toward said parallel efficiency.

12. A computer-readable storage medium storing a program for causing a computer to calculate a parallel efficiency of a parallel computer system in which no load imbalance exists, said program comprising:

obtaining and storing into a storage a first value concerning a processing time for a portion to be sequentially processed during an execution of a parallel processing program, a second value concerning a processing time for a portion to be parallel processed during the execution of said parallel processing program, and a third value concerning a total processing time for said parallel processing program;

calculating and storing into said storage a parallelized rate by using the obtained first value and the obtained second value; and calculating and storing into said storage a product of an inverse of said parallelized rate, an inverse of a value of said third value, and said second value as a parallel efficiency, wherein calculating said parallelized rate includes multiplying said second value by the number of processors to obtain a fourth value concerning a processing time in sequential processing for the portion to be parallel processed during the execution of said parallel processing program, and calculating (said fourth value)/(said first value+said fourth value) as said parallelized.

13. An apparatus for calculating a parallel efficiency of a parallel computer system in which no load imbalance exists, comprising:

means for obtaining and storing into a storage a first value concerning a processing time for a portion to be sequentially processed during an execution of a parallel processing program, a second value concerning a processing time for a portion to be parallel processed during the execution of said parallel processing program, and a third value concerning a processing time caused by an overhead for parallel processing from a result of one measurement for said parallel computer system;

a first calculator for calculating and storing into said storage a parallelized rate, a sequential calculation time ratio that is defined as a ratio of said first value to a value concerning a total processing time during the execution of said parallel processing program, and a parallel overhead ratio by using said first value, said second value, and said third value; and a second calculator for calculating and storing into said storage a parallel efficiency by using said parallelized rate, said sequential calculation time ratio, and said parallel overhead ratio, wherein said first calculator includes
- a multiplier for multiplying said second value by the number of processors to obtain a fourth value concerning a processing time in sequential processing for the portion to be parallel processed during the execution of said parallel processing program, and
- a calculator for calculating (said fourth value)/(said first value+said fourth value) as said parallelized rate, and said second calculator includes a calculator for calculating 1/(said parallelized rate)×(1−(said sequential calculation time ratio)−(said parallel overhead ratio)) as said parallel efficiency.

14. The apparatus as set forth in claim 13, wherein said first value concerning the processing time for the portion to be sequentially processed is a number of times that sequential processing is performed, and is determined in a confirmation of execution status for each predetermined period during the execution of said parallel processing program, said second value concerning the processing time for the portion to be parallel processed is a number of times that parallel processing is performed, and is determined in the confirmation of the execution status for each predetermined period during the execution of said parallel processing program, and said third value concerning the processing time caused by the overhead for the parallel processing is a number of times that processing caused by the overhead for the parallel processing is performed, and is determined in the confirmation of the execution status for each predetermined period during the execution of said parallel processing program.

15. The apparatus as set forth in claim 13, wherein said first calculator further includes a divider for dividing said third value by a value concerning a total processing time during the execution of said parallel processing program to obtain said parallel overhead ratio.

16. The apparatus as set forth in claim 13, further comprising an output device for outputting said paralleized rate, said sequential calculation time ratio, said parallel overhead ratio, and said parallel efficiency.

17. The apparatus as set forth in claim 13, further comprising an analyzer for analyzing contribution of said parallelized rate, said sequential calculation time ratio, and parallel overhead ratio toward said parallel efficiency.

18. An apparatus for calculating a parallel efficiency of a parallel computer system, comprising:

means for obtaining and storing into a storage a first value concerning a processing time for a portion to be sequentially processed during an execution of a parallel processing program, a second value concerning a processing time for a portion to be parallel processed during the execution of said parallel processing program, and a third value concerning total processing time for said parallel processing program;

a first calculator for calculating and storing into said storage a parallelized rate by using the obtained first value and the obtained second value; and a second calculator for calculating and storing into said storage a product of an inverse of said parallelized rate, an inverse of a value of said third value, and said second value as a parallel efficiency, wherein said first calculator includes
- a multiplier for multiplying said second value by the number of processors to obtain a fourth value concerning a processing time in sequential processing for the portion to be parallel processed during the execution of said parallel processing program, and
- a calculator for calculating (said fourth value)/(said first value+said fourth value) as said parallelized rate.

* * * * *

UNITED STATES PATENT AND TRADEMARK OFFICE
CERTIFICATE OF CORRECTION

| | | |
|---|---|---|
| PATENT NO. | : 7,024,667 B2 | Page 1 of 1 |
| APPLICATION NO. | : 09/998160 | |
| DATED | : April 4, 2006 | |
| INVENTOR(S) | : Shigeo Orii | |

It is certified that error appears in the above-identified patent and that said Letters Patent is hereby corrected as shown below:

On the cover page: item

(56) References Cited, Other Publications, col. 1, line 1, after "et al" insert --,--

Col. 2, line 7, after "et al." insert --,--

(57) Abstract, col. 2, line 5, after "system" change "," to --.--

Col. 16, line 2, change "processing program;" to --computer system;--

Col. 16, line 55, change "ratios" to --ratio,--

Col. 17, line 3, change "paralell" to --parallel--

Col. 17, line 5, after "rate" delete ","

Col. 17, line 16, change "paralell" to --parallel--

Col. 17, line 41, change "ratios" to --ratio,--

Col. 18, line 22, change "ratios" to --ratio--

Col. 18, line 50, after "parallelized" delete "." insert --rate.--

Col. 20, line 5, change "paralleized" to --parallelized--

Signed and Sealed this

Seventeenth Day of April, 2007

JON W. DUDAS
*Director of the United States Patent and Trademark Office*